US010252792B2

(12) United States Patent
Hutcheson et al.

(10) Patent No.: US 10,252,792 B2
(45) Date of Patent: Apr. 9, 2019

(54) FLOW DISRUPTION DEVICES FOR THE REDUCTION OF HIGH LIFT SYSTEM NOISE

(71) Applicant: The United States of America as represented by the Administrator of the National Aeronautics and Space Administration, Washington, DC (US)

(72) Inventors: Florence V. Hutcheson, Virginia Beach, VA (US); Thomas F. Brooks, The Villages, FL (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 317 days.

(21) Appl. No.: 15/130,236

(22) Filed: Apr. 15, 2016

(65) Prior Publication Data
US 2016/0311524 A1 Oct. 27, 2016

Related U.S. Application Data

(60) Provisional application No. 62/150,602, filed on Apr. 21, 2015, provisional application No. 62/262,595, filed on Dec. 3, 2015.

(51) Int. Cl.
*B64C 23/06* (2006.01)
*B64C 9/12* (2006.01)

(52) U.S. Cl.
CPC ............... *B64C 23/06* (2013.01); *B64C 9/12* (2013.01); *B64C 2220/00* (2013.01);
(Continued)

(58) Field of Classification Search
CPC .................................. B64C 9/12; B64C 23/06
See application file for complete search history.

(56) References Cited

U.S. PATENT DOCUMENTS 3,578,264 A * 5/1971 Kuethe ................... B64C 21/10
181/220
3,744,745 A * 7/1973 Kerker ..................... B64C 7/02
244/199.1
(Continued)

OTHER PUBLICATIONS

Florence V. Hutcheson, Thomas F. Brooks, William M. Humphreys, Jr., "Noise radiation from a continuous mold-line link flap configuration", International Journal of Aeroacoustics, 2012, pp. 531-554, vol. 11, Nos.
(Continued)

*Primary Examiner* — Justin M Benedik
(74) *Attorney, Agent, or Firm* — Robin W. Edwards; Mark P. Dvorscak

(57) ABSTRACT

Various embodiments provide systems and methods for noise reduction for lift-augmentation wing-sections (e.g., flaps, slats, elevons, etc.) by the use of flow disruption devices placed upstream of vortex generation locations. The flow disruption devices may reduce the noise radiating from side edges of lift-augmentation control wing sections. An embodiment flow disruption device may include a body configured to protrude into a flow over a vehicle's surface, wherein the body is coupled to the vehicle upstream of a side edge of a structure of the vehicle such that a wake produced by the body introduces unsteadiness and a flow velocity deficit in a vortex formation region of the side edge of the structure.

20 Claims, 13 Drawing Sheets

(52) U.S. Cl.
CPC ......... *B64C 2230/14* (2013.01); *Y02T 50/162* (2013.01); *Y02T 50/166* (2013.01)

(56) References Cited

U.S. PATENT DOCUMENTS

| | | | | |
|---|---|---|---|---|
| 3,968,946 | A * | 7/1976 | Cole | B64C 7/02 244/130 |
| 4,291,853 | A * | 9/1981 | Sigalla | B64C 5/02 244/199.1 |
| 4,323,209 | A * | 4/1982 | Thompson | B64C 23/06 244/199.1 |
| 4,540,143 | A * | 9/1985 | Wang | B64C 7/02 244/130 |
| 4,643,376 | A * | 2/1987 | Vanderhoeven | B64C 7/02 244/130 |
| 5,058,837 | A * | 10/1991 | Wheeler | B64C 23/06 244/198 |
| 5,156,362 | A * | 10/1992 | Leon | B64C 23/06 244/130 |
| 5,598,990 | A * | 2/1997 | Farokhi | B64C 23/06 244/198 |
| 5,803,602 | A * | 9/1998 | Eroglu | B01F 5/0603 138/37 |
| 6,126,118 | A * | 10/2000 | Fujino | B64C 7/02 244/130 |
| 6,363,972 | B1 * | 4/2002 | Umazume | B63B 1/36 138/177 |
| 6,491,260 | B2 * | 12/2002 | Borchers | B64C 21/10 244/199.1 |
| 6,964,397 | B2 * | 11/2005 | Konings | B64C 7/02 244/130 |
| 7,484,930 | B2 | 2/2009 | Hutcheson et al. | |
| 7,878,457 | B2 * | 2/2011 | Narramore | B64C 23/06 244/200.1 |
| 9,464,532 | B2 * | 10/2016 | Sutton | F01D 7/00 |
| 2009/0020652 | A1 * | 1/2009 | Rincker | B64C 23/06 244/204 |
| 2011/0132246 | A1 * | 6/2011 | Venables | B63B 39/06 114/126 |

OTHER PUBLICATIONS

Oerlemans, S. and Pott-Pollenske, M., "An Experimental Study of Gear Wake/Flap Interaction Noise", 10th Annual AIAA/CEAS Aeroacoustics Conference, AIAA Paper 2004-2886, May 10-12, 2010, Manchester, Great Britain.

Khorrami, M., Mineck, R. Yao, C. and Jenkins, L., "A Comparative Study of Simulated and Measured Gear-Flap Flow Interaction", 21st AIAA/CEAS Aeroacoustics Conference, AIAA paper 2015-2989, Jun. 22-26, 2015, Dallas, Texas.

Brooks, T. and Humphreys, W., "Flap Edge Aeroacoustics Measurements and Predictions", Journal of Sound and Vibration, 2003, pp. 31-74, vol. 261.

Khorrami, M., Singer, B. and Takallu, M., "Analysis of Flap Side Edge Flow Field for Identification and Modeling of Possible Noise Sources", Noise and Vibration Conference and Exposition, SAE Paper 971917, May 20-22, 1997, Traverse City, Michigan.

Brooks, T. and Humphreys, W. "A Deconvolution approach for the mapping of Acoustics Sources (DAMAS) Determined from Phased Microphone Arrays", Journal of Sound and Vibration, 2006, pp. 856-879, vol. 294.

Hutcheson, F. V., Stead, D. J. and Plassman, G. E., "Experimental Study of Wake/Flap Interaction Noise and the Reduction of Flap Side Edge Noise", paper accepted for presentation at the AIAA/CEAS Aeroacoustics Conference, May 30-Jun. 1, 2016, Lyon France.

Guo, Yueping, "On Noise Reduction by Flap Side Edge Fences", Journal of Sound and Vibration, 2004, pp. 369-390, vol. 277.

* cited by examiner

FLOW DISRUPTION DEVICES FOR THE REDUCTION OF HIGH LIFT SYSTEM NOISE

CROSS-REFERENCE TO RELATED APPLICATIONS

This patent application claims the benefit of and priority to U.S. Provisional Patent Application No. 62/150,602 filed Apr. 21, 2015 and U.S. Provisional Patent Application No. 62/262,595 filed Dec. 3, 2015. The contents of both applications are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

With the continuing expansion in air travel brought on by the global marketplace, the aviation industry stands to gain an even greater share of the world's markets, and continued competitiveness is important to airplane operators as the aviation industry grows. Quieter airplanes have a competitive advantage, and aircraft noise continues to be a barrier to growth in the aviation industry. Increases in air traffic and growth in populations that surround airports result in a noise impact on a larger percentage of the community and a stronger desire to reduce the noise around airports. For example, concerns about aircraft noise have resulted in noise based landing fees at some major airports. Accordingly, aircraft manufacturers desire technologies across their product line to further reduce noise.

During airport approach and landing, airframe noise is the dominant noise source. The noise that is generated at the side edges of the flaps, elevons, and slats has been identified as an important airframe noise component and is a target for noise control. Previous noise reduction efforts related to side edge noise reduction have been complex and difficult to implement on actual aircraft which may counter any noise reduction value from previous reduction efforts.

BRIEF SUMMARY OF THE INVENTION

Various embodiments provide noise reduction for lift-augmentation wing-sections (e.g., flaps, slats, elevons, etc.) by the use of flow disruption devices placed upstream of vortex generation locations. The flow disruption devices (also referred to as wake generators) may reduce the noise radiating from side edges of lift-augmentation control wing sections.

An embodiment flow disruption device may include a body configured to protrude into a flow over a vehicle's surface, wherein the body is coupled to the vehicle such that a wake produced by the body introduces unsteadiness and a flow velocity deficit in a vortex formation region of a side edge of a structure of the vehicle. In an embodiment, the flow disruption device may include an actuator configured to extend and retract the body from the vehicle's surface. In an embodiment, the actuator may be a Shape Memory Alloy (SMA) actuator, such as a SMA torque tube and/or SMA linear actuator. In an embodiment, the body may be configured to telescopically extend and retract from the vehicle's surface. In an embodiment, a length of the body may be adjustable based on one or both of a flight condition and a flap deflection level. In an embodiment, the actuator may be a first SMA torque tube configured to extend and retract the body from the vehicle's surface and a second SMA linear actuator configured to adjust the length of the body. In an embodiment, the vehicle may be an aircraft and the structure of the vehicle may be a lift-augmentation control wing section, such as a flap, slat, or elevon.

An embodiment method may include installing, in a wing, a flow disruption device comprising a body configured to protrude into a flow over the wing's surface, wherein the flow disruption device is installed in the wing such that a wake produced by the body introduces unsteadiness and a flow velocity deficit in a vortex formation region of a side edge of a lift-augmentation control wing section.

An embodiment method may include deploying a flow disruption device comprising a body such that the body protrudes into a flow over a wing's surface upstream of a side edge of a lift-augmentation control wing section and such that a wake produced by the body introduces unsteadiness and a flow velocity deficit in a vortex formation region of the side edge of the lift-augmentation control wing section.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1A:
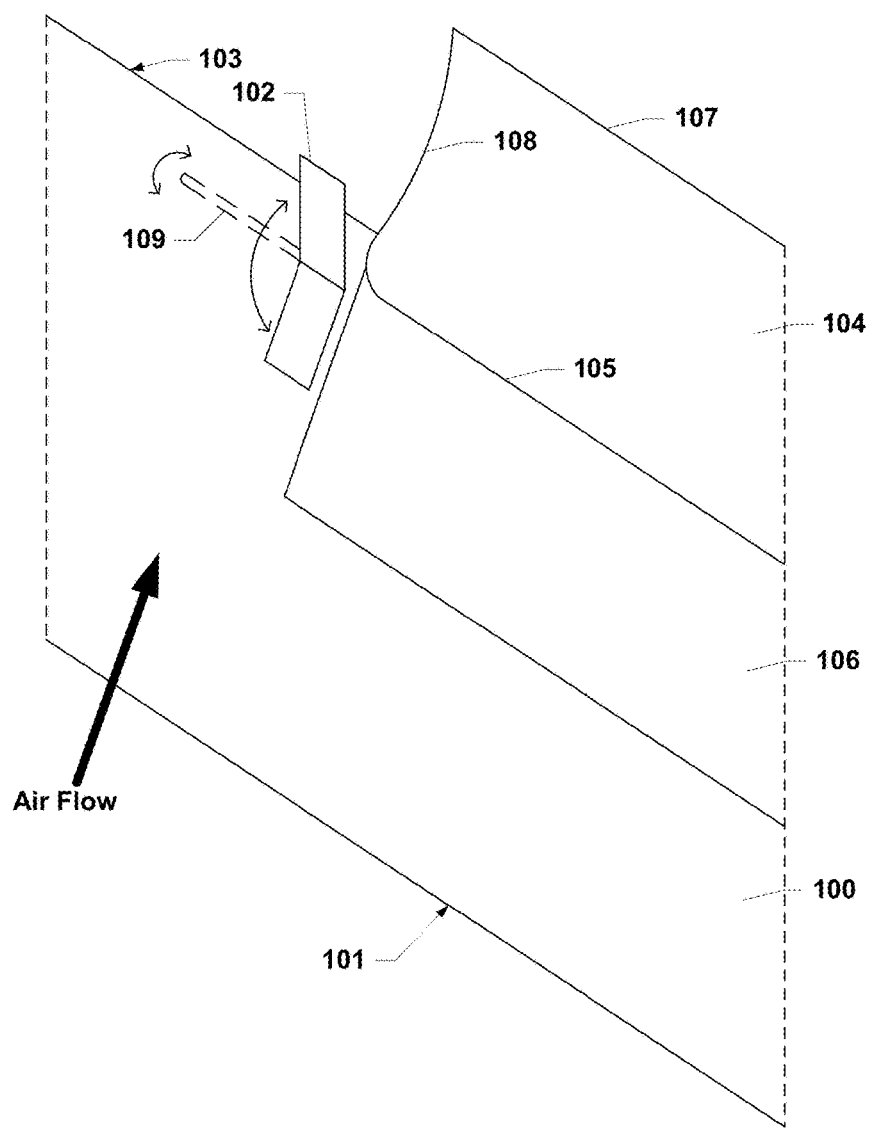
FIGS. 1A-3B illustrate example flow disruption devices placed upstream of a vortex generation location that provides noise reduction.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments are discussed herein in relation to "aircraft" and "airplanes." The terms "aircraft" and "airplanes" are used merely as example vehicles to better illustrate aspects of the various embodiments, and are not intended to limit the scope of the disclosure or claims. Other vehicles may be substituted in the various embodiments.

Various embodiments provide noise reduction for lift-augmentation wing-sections (e.g., flaps, slats, elevons, etc.) and/or other aircraft structures by the use of flow disruption devices placed upstream of vortex generation locations. The flow disruption devices (also referred to as wake generators) may reduce the noise radiating from side edges of lift-augmentation control wing sections, such as flaps, elevons, and slats, and/or other aircraft structures. The noise generated at the side edges of aircraft structures, such as lift-augmentation control wing sections (e.g., flaps, elevons, slats, etc.), landing gear structures, etc., may be caused by instabilities in the strong vortex system that may be present along these side edges. By weakening this vortex system, various embodiments may achieve noise reduction.

In various embodiments, a flow disruption device may be a body, such as a bar, tab, spike, knob, or any other shape protrusion, that protrudes into the flow (e.g., airflow over the vehicle surface, such as an aircraft surface) and is placed upstream of the side edge of a vehicle structure (e.g., a lift-augmentation control wing section), such that the wake produced by the flow disruption device introduces unsteadiness and a flow velocity deficit in the vortex formation region. The noise reduction may result from a weakened vortex system and weakened shear flow.

In various embodiments, one or more flow disruption devices may be installed on a wing, such as at the flap leading edge or preferably on the main element, such that the one or more flow disruption devices do not have any interference with the deployment and movement of the flap. The one or more flow disruption devices may be deployed telescopically such that the length can be adjusted to fit any given flight condition. The one or more flow disruption devices may be solid pieces that conform to the main element surface and that may be deployed into the flow when needed.

As engine noise may dominate the overall aircraft noise during takeoff, in various embodiments, the one or more flow disruption devices may be deployed selectively during airport approach (when engine noise is on par or lower than airframe noise and when reducing flap side edge noise would have a significant impact on the overall aircraft noise). A large flow disruption device may have the added benefit of providing needed drag in addition to noise reduction.

The embodiment flow disruption devices may provide the same or significantly better noise reduction performance than noise reduction current technology. Implementation of the embodiment flow disruption devices may be achieved through various actuation technologies, such as Shape Memory Alloy (SMA) technology, servo motors, hydraulic actuators, gear drive systems, etc. The embodiment flow disruption devices may be retrofitted to current vehicle configurations.

FIGS. 1A-3B, 9A, and 9B illustrate example flow disruption devices according to various embodiments.

Figure 1B:
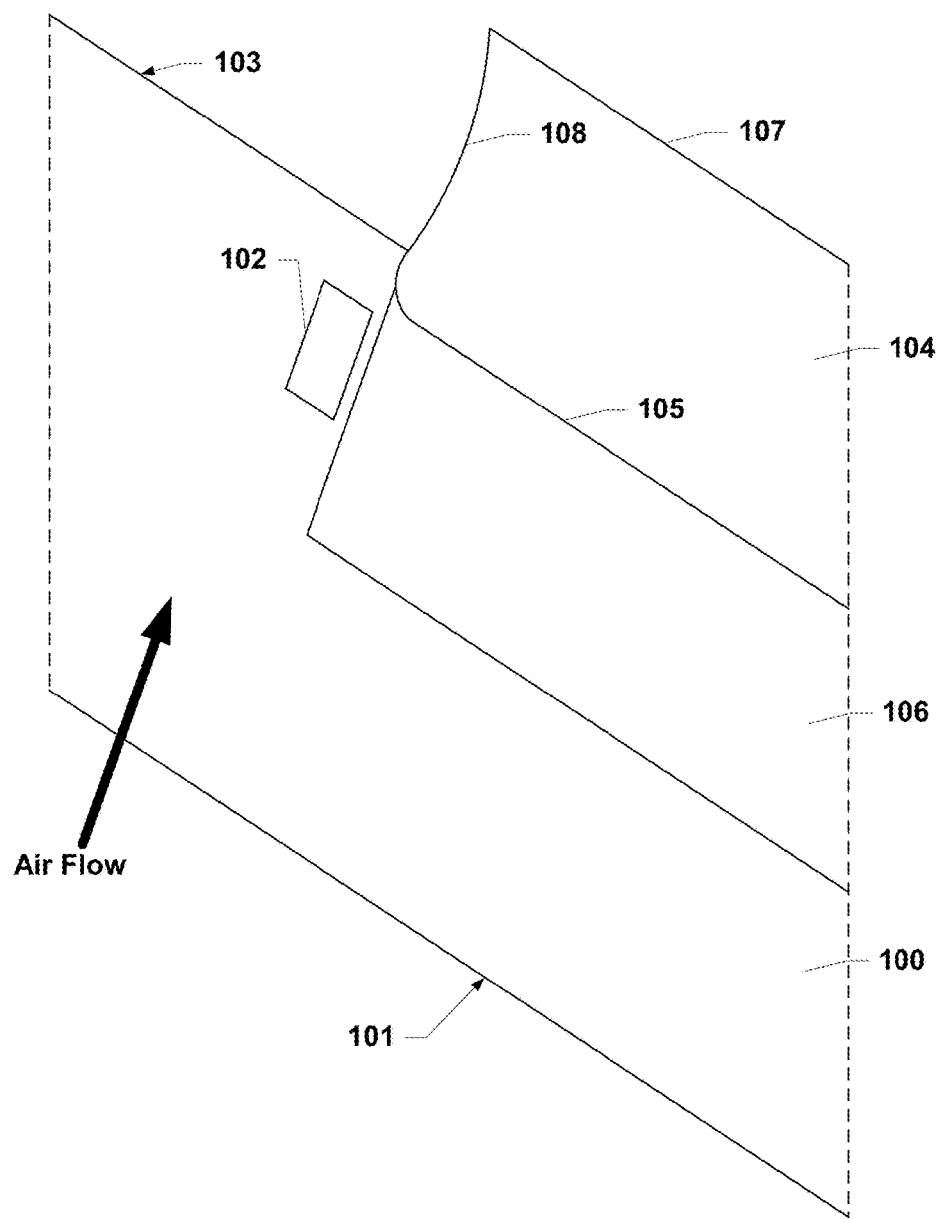

FIGS. 1A and 1B illustrate an example flow disruption device 102 placed upstream of a vortex generation location that provides noise reduction for a lift-augmentation wing-section (e.g., a flap 104). In FIG. 1A the flow disruption device 102 is shown in a deployed position. The flow disruption device 102 may be installed on the airfoil (e.g., wing 100) in various locations upstream of a vortex generation location, such as a side edge 108 of the flap 104. The air flow may move from the leading edge 101 of the wing 100 to the trailing edge 103 of the wing 100. The flow disruption device 102 may be installed upstream of the side edge 108 of the flap 104 such that as the air flow moves from the leading edge 101 of the wing 100 to the trailing edge 103 of the wing 100, the air flow interacts with the flow disruption device 102 before interacting with the edge 108 of the flap 104. In an embodiment, the flap actuation device 102 may be positioned on the main body of the wing 100 such that the flap actuation device 102 does not mechanically interfere with the flap 104 leading edge 105, trailing edge 107, side edge 108, or flap cove 106. The flap actuation device 102 may be deployed and/or retracted by the operation of one or more actuator, such as a SMA actuator, a servo motor, hydraulic piston, gear drive, etc. For example, the actuator may be a SMA torque tube 109 installed in the wing 100 pre-twisted. Upon heating, the SMA torque tube 109 may revert to its untwisted state, thereby deploying the flow disruption device 102. When the SMA torque tube 109 is allowed to cool, the flow disruption device 102 may be retracted flush with the wing 100 surface profile as illustrated in FIG. 1B.

Figure 2A:
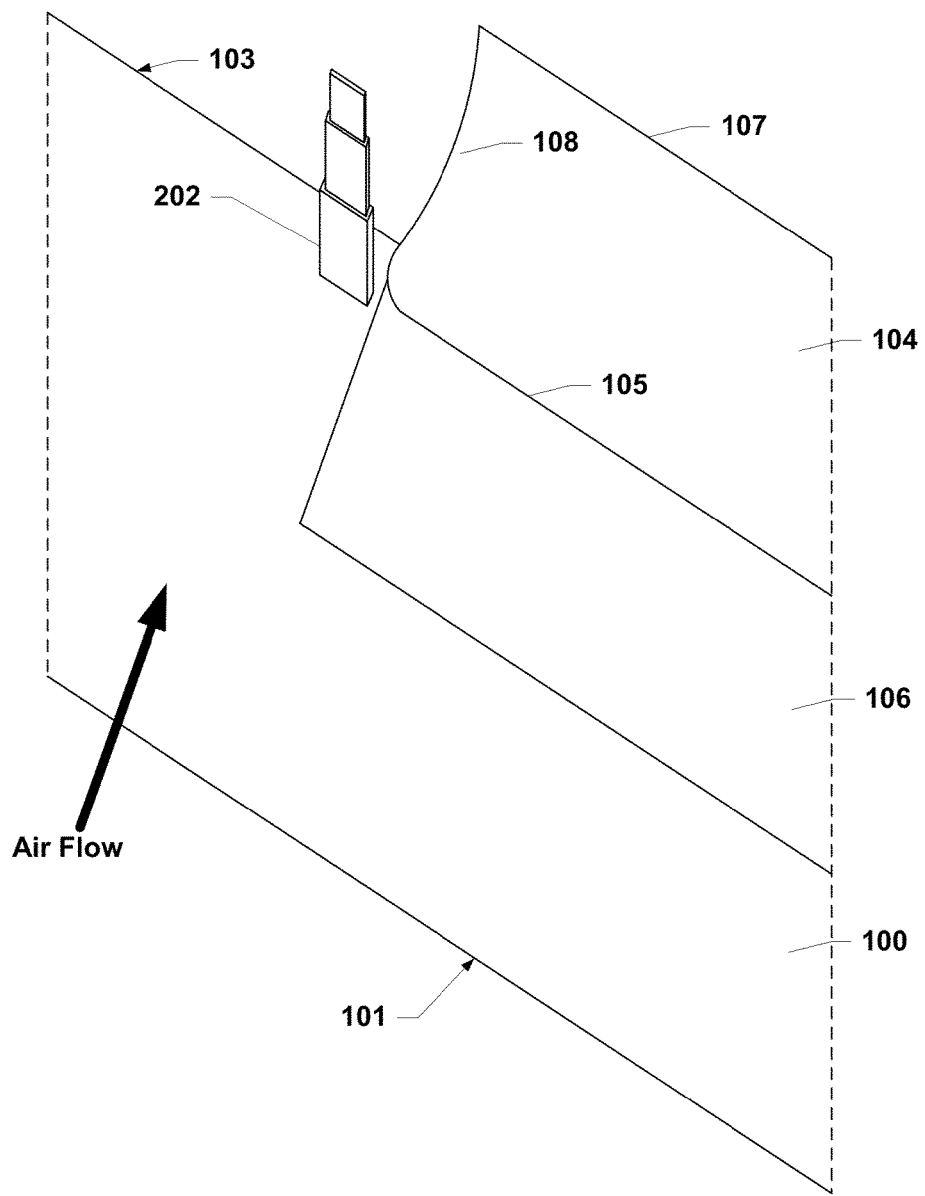
Figure 2B:
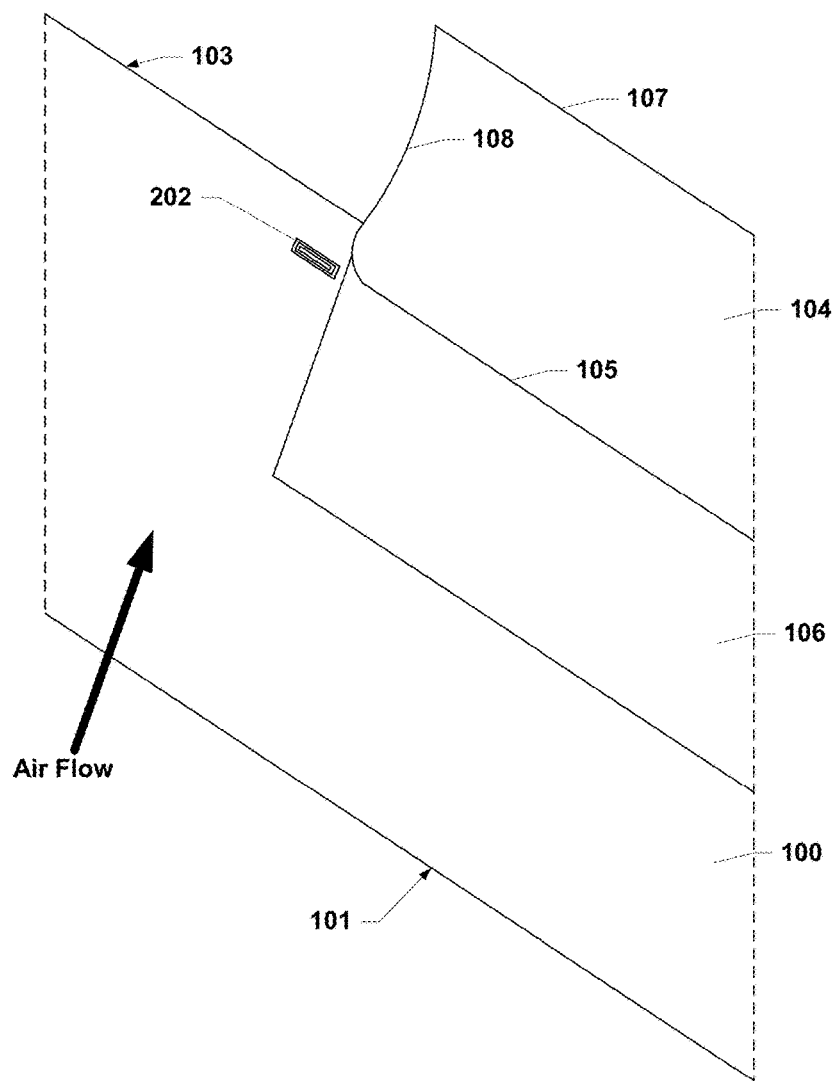

FIGS. 2A and 2B illustrate an example flow disruption device 202 placed upstream of a vortex generation location that provides noise reduction for a lift-augmentation wing-section (e.g., a flap 104). In FIG. 2A the flow disruption device 202 is shown in a deployed position. The flow disruption device 202 may be installed on the airfoil (e.g., wing 100) in various locations upstream of a vortex generation location, such as a side edge 108 of the flap 104. The air flow may move from the leading edge 101 of the wing 100 to the trailing edge 103 of the wing 100. The flow disruption device 202 may be installed upstream of the side edge 108 of the flap 104 such that as the air flow moves from the leading edge 101 of the wing 100 to the trailing edge 103 of the wing 100, the air flow interacts with the flow disruption device 202 before interacting with the edge 108 of the flap 104. In an embodiment, the flap actuation device 202 may be positioned on the main body of the wing 100 such that the flap actuation device 202 does not mechanically interfere with the flap 104 leading edge 105, trailing edge 107, side edge 108, or flap cove 106. The flap actuation device 202 may be deployed and/or retracted by the operation of one or more actuator, such as a SMA actuator, a servo motor, hydraulic piston, gear drive, etc. For example, the actuator may be a SMA linear actuator installed in the wing 100. Upon heating, the SMA linear actuator may extend, thereby deploying telescoping sections of the flow disruption device 202. When the SMA linear actuator is allowed to cool, the flow disruption device 202 may be retracted flush with the wing 100 surface profile as illustrated in FIG. 2B. In an embodiment, the extended length of the flow disruption device 202 may be adjusted by controlling the extension of the SMA linear actuator, such that the length may be selected to fit a flight condition and/or flap 104 deflection level. In this manner, adjusting the length of the flow disruption device 202 may enable noise reduction to be optimized for different flight conditions and/or flap 104 deflections.

Figure 3A:
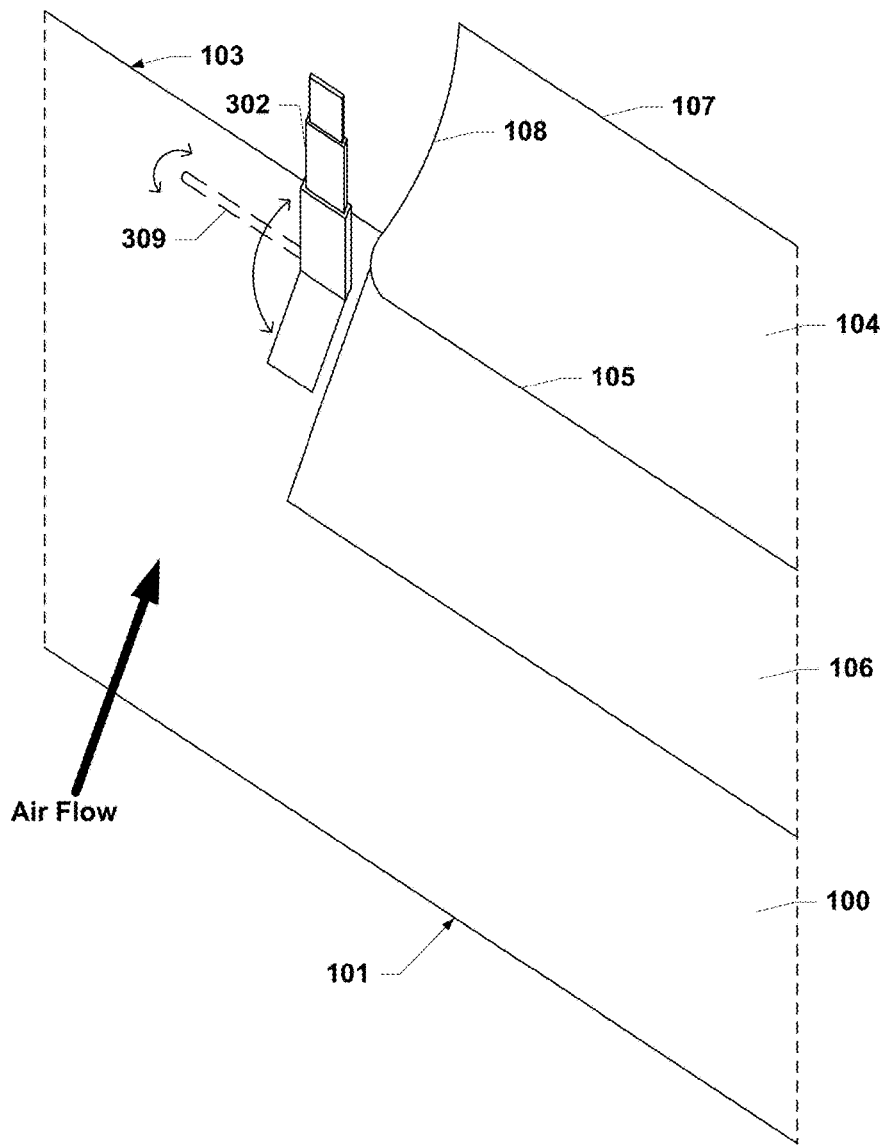
Figure 3B:
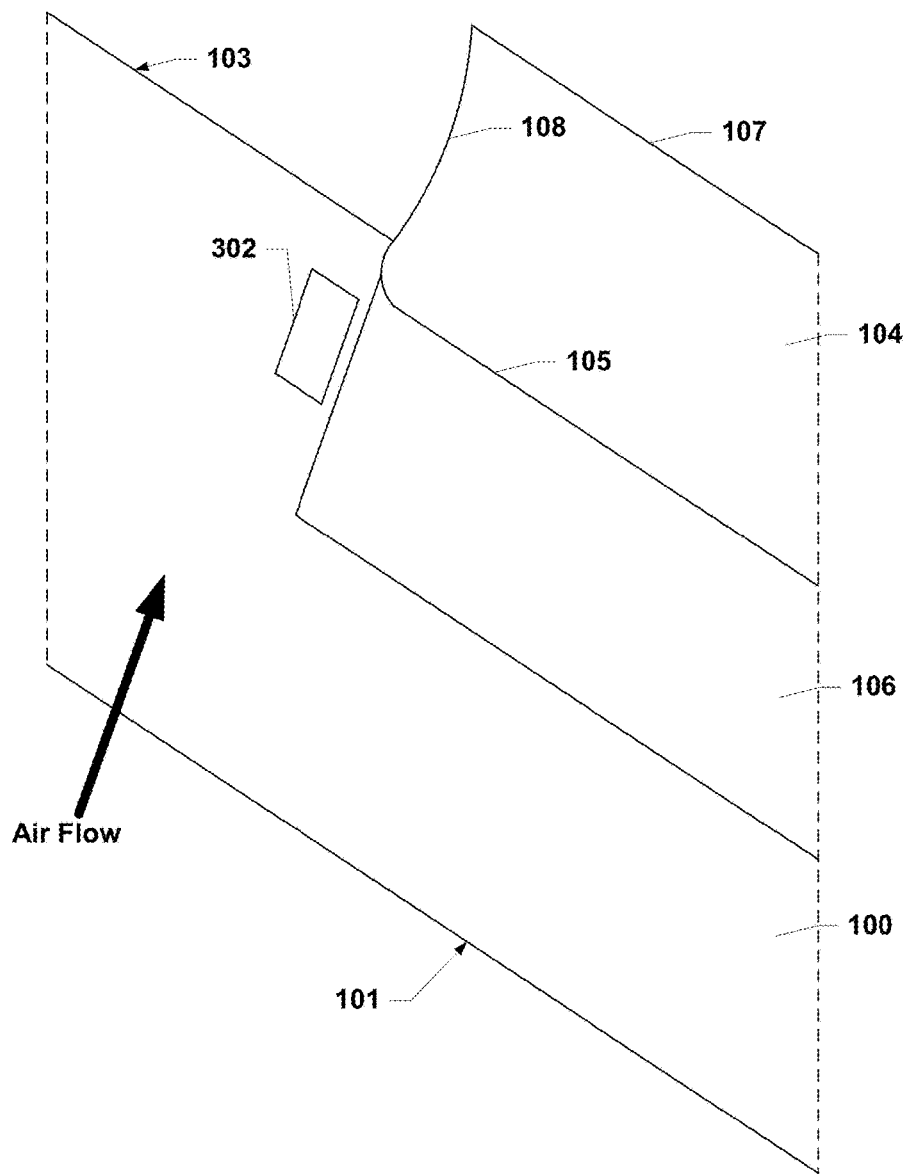

FIGS. 3A and 3B illustrate an example flow disruption device 302 placed upstream of a vortex generation location that provides noise reduction for a lift-augmentation wing-section (e.g., a flap 104). In FIG. 3A the flow disruption device 302 is shown in a deployed position. The flow disruption device 302 may be installed on the airfoil (e.g., wing 100) in various locations upstream of a vortex generation location, such as a side edge 108 of the flap 104. The air flow may move from the leading edge 101 of the wing 100 to the trailing edge 103 of the wing 100. The flow disruption device 302 may be installed upstream of the side edge 108 of the flap 104 such that as the air flow moves from the leading edge 101 of the wing 100 to the trailing edge 103 of the wing 100, the air flow interacts with the flow disruption device 302 before interacting with the edge 108 of the flap 104. In an embodiment, the flap actuation device 302 may be positioned on the main body of the wing 100 such that the flap actuation device 302 does not mechanically interfere with the flap 104 leading edge 105, trailing edge 107, side edge 108, or flap cove 106. The flap actuation device 302 may be deployed and/or retracted by the operation of one or more actuator, such as a SMA actuator, a servo motor, hydraulic piston, gear drive, etc. For example, the actuator may be combination of two or more actuators, such as a SMA torque tube 309 and a SMA linear actuator installed in the wing 100 and/or flap actuation device 302 itself. SMA torque tube 309 may be installed pre-twisted. Upon heating, the SMA torque tube 309 may revert to its untwisted state, thereby deploying the flow disruption device 302. Additionally, the SMA linear actuator may be heated and/or cooled to extend and/or retract telescoping segments of the flow disruption device 302 to increase and/or decrease the length of the flow disruption device 302. In an embodiment, the extended length of the flow disruption device 302 may be adjusted by controlling the extension of the SMA linear actuator, such that the length may be selected to fit a flight condition and/or flap 104 deflection level. In this manner, adjusting the length of the flow disruption device 302 may enable noise reduction to be optimized for different flight conditions and/or flap 104 deflections. When the SMA torque tube 309 and the SMA linear actuator are allowed to cool, the flow disruption device 302 may be retracted flush with the wing 100 surface profile as illustrated in FIG. 3B.

Figure 9A:
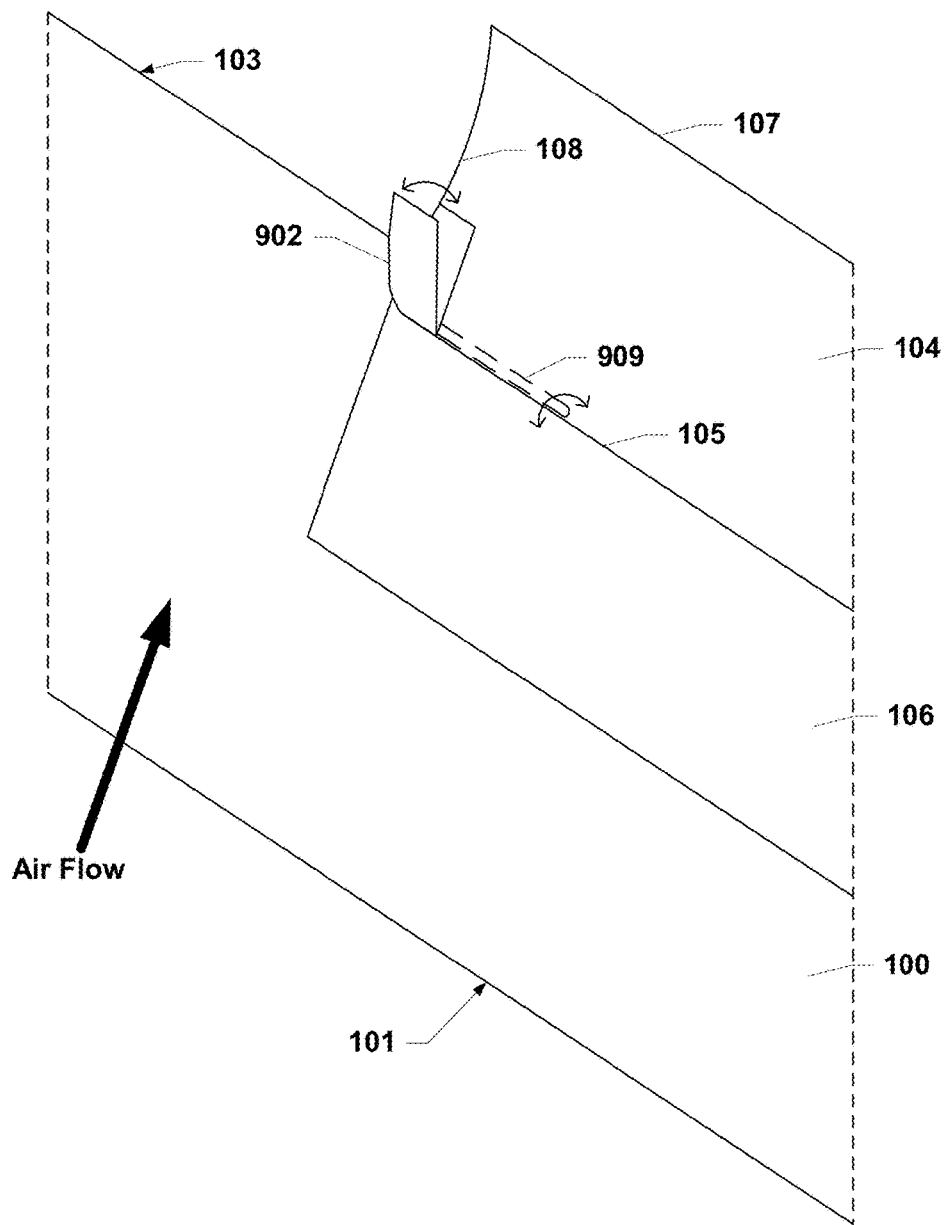
FIGS. 9A-9B illustrate another example flow disruption device that provides noise reduction.
Figure 9B:
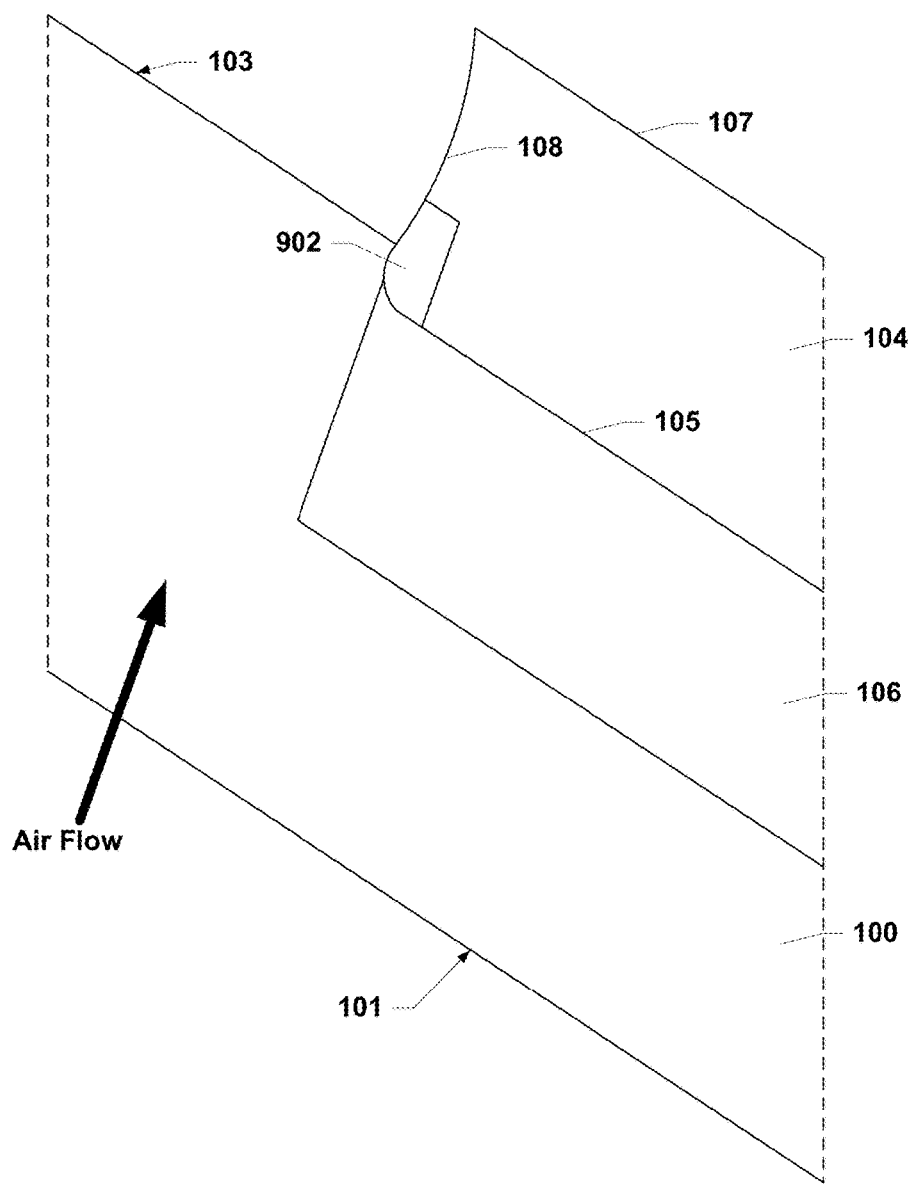

FIGS. 9A and 9B illustrate an example flow disruption device 902 placed on a lift-augmentation wing-section (e.g., a flap 104) such that, when deployed, the flow disruption device 902 is upstream of a vortex generation location to provide noise reduction for the lift-augmentation wing-section (e.g., a flap 104). In FIG. 9A the flow disruption device 902 is shown in a deployed position. The flow disruption device 902 may be installed against the flap 104 side edge 108 and the flap 104 leading edge 105 such that, when deployed, the flow disruption device 902 is upstream of a vortex generation location, such as a side edge 108 of the flap 104. The air flow may move from the leading edge 101 of the wing 100 to the trailing edge 103 of the wing 100 and from the leading edge 105 of the flap 104 to the trailing edge 107 of the flap 104. The flow disruption device 902 may be installed against the flap 104 side edge 108 and the flap 104 leading edge 105 such that, when the flow disruption device 902 is deployed, the air flow interacts with the flow disruption device 902 before interacting with the edge 108 of the flap 104 as the air flow moves from the leading edge 101 of the wing 100 to the trailing edge 103 of the wing 100 and from the leading edge 105 of the flap 104 to the trailing edge 107 of the flap 104. The flap actuation device 902 may be deployed and/or retracted by the operation of one or more actuator, such as a SMA actuator, a servo motor, hydraulic piston, gear drive, etc. For example, the actuator may be a SMA torque tube 909 installed in the flap 104 pre-twisted. Upon heating, the SMA torque tube 909 may revert to its untwisted state, thereby deploying the flow disruption device 902. When the SMA torque tube 909 is allowed to cool, the flow disruption device 902 may be retracted flush with the flap 104 surface profile as illustrated in FIG. 9B. Additionally, as illustrated in FIGS. 9A and 9B, the shape of the flow disruption device 902 may not be symmetrical.

While the flow disruption devices 102, 202, 302, and 902 are illustrated in relative proportion to the flap 104 and wing 100, the relative proportions are not meant to be limiting in any way. The flow disruption devices 102, 202, 302, and 902 may be built larger or smaller based on flight conditions and/or aircraft configuration. Noise reduction benefits may relatively improve to a point with increases in the flow disruption devices 102, 202, 302, and 902 widths and depths.

While certain shapes of flow disruption devices, such as flow disruption devices 102, 202, 302, and 902, are discussed and illustrated herein, other shape protrusions may be used as flow disruption devices, including bars, tabs, spikes, knobs, or any other shape protrusion singularly and/or in combination.

While certain placements of flow disruption devices, such as flow disruption devices 102, 202, 302, and 902 are discussed and illustrated herein, such as placement on a wing 100 main airfoil and/or on a lift-augmentation wing-section (e.g., a flap 104), other placements of the flow disruption devices may be used, including placements on other portions of a wing (e.g., a wing leading edge, in a flap cove, etc.), other placements on a lift-augmentation wing-section (e.g., set back from the leading edge of a flap, etc.), other placements on other light augmentation wing-sections (e.g., various locations on elevons, various locations on slats, etc.), other placements on other aircraft structures (e.g., on a fuselage, on a cowling, etc.), combinations of these other placements, and/or in any other placement such that a wake produced by the flow disruption device introduces unsteadiness and/or a flow velocity deficit in a vortex formation region of a side edge.

Sample Experimental Results

Experiments were performed in accordance with the various embodiments to examine the effects of the interaction of a wake with a half-span flap on the radiated noise. Particular attention was given to the noise resulting from the wake interaction with the flap side-edge. The incident wake was generated by simple blunt bodies (bars). The test objectives were as follows: (1) Determine the interaction noise sensitivity to the wake generator placement and geometry; (2) Identify the potential of wake generators for the reduction of flap side-edge noise; (3) Identify low noise landing gear placement.

The experiments were conducted at NASA Langley Research Center in the Quiet Flow Facility (QFF). The QFF is an anechoic facility equipped with a 2 by 3 foot rectangular nozzle. Side plates attached to the 2-foot sides of the nozzle are used to support models above the nozzle, while the 3-foot sides of the test section remain open. The test model used in the experiment was a 16-inch chord, 3-foot span NACA 632-215 main element airfoil with a halfspan Fowler flap. The main airfoil was positioned in the test section at an angle of attack of 16° such that the local aerodynamics properly represented high-lift device conditions on the flap and in the main element aft region. Streamlined V-brackets were used to position the flap. Strips of serrated tape (0.004" thick) were placed along the span of the main airfoil to trip the boundary layer and induce its transition to turbulence. The strips were positioned along the model pressure and suction sides at 9% chord, along the model pressure side at 27% chord, and along the airfoil leading edge (LE).

Figure 4:
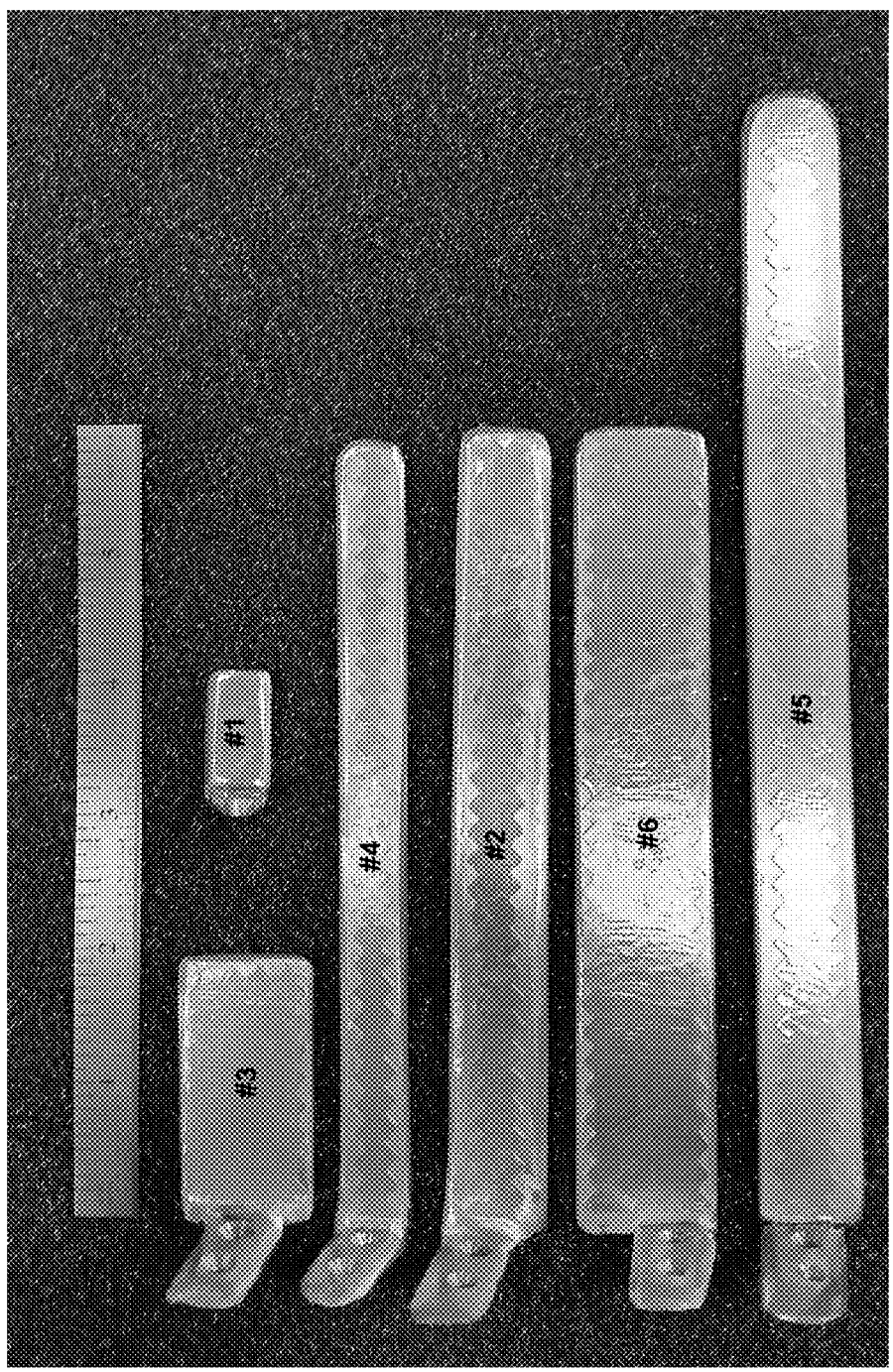
FIG. 4 shows bars of various widths and lengths used in experiments of embodiment flow disruption devices.
Figure 5:
FIG. 5 shows an embodiment flow disruption device mounted to the main airfoil upstream of the flap side edge.

In a first part of the study, the interaction noise from the wake produced by simple bluff body geometries was examined. The bluff bodies consisted of bars of various widths and lengths. Referring to FIG. 4 the bars' width and length were, respectively, as follow: bar #1: 0.5"×1"; bar #2: 0.7"×6"; bar #3: 1"×2"; bar #4: 0.5"×6"; bar #5: 0.7"×8.5"; bar #6: 1"×6". Bar #2 is shown mounted to the main airfoil, upstream of the flap side-edge in FIG. 5.

A microphone phased array consisting of 41 B&K ⅛" microphones projecting from an acoustically treated frame, was used to acquire the acoustic data. The array was positioned at a fixed location in the model mid-span plane, 5 feet from the main airfoil's trailing edge, on the model pressure side. A screen of thin fabric was installed over the face of the array to prevent wind gusts from increasing microphone self-noise. Four additional microphones were distributed in the model mid-span plane for additional directivity. Noise measurements were performed for flow speeds ranging from Mach 0.09 to 0.17 and for two flap deployment angles, respectively, 29° and 39°. High- and low-pass filters were set, respectively, at 70 Hz and 50 kHz, and 1,000 non-overlapping segments of $2^{13}$ data points were acquired at a sample rate of 142.85 kHz.

Figure 6:
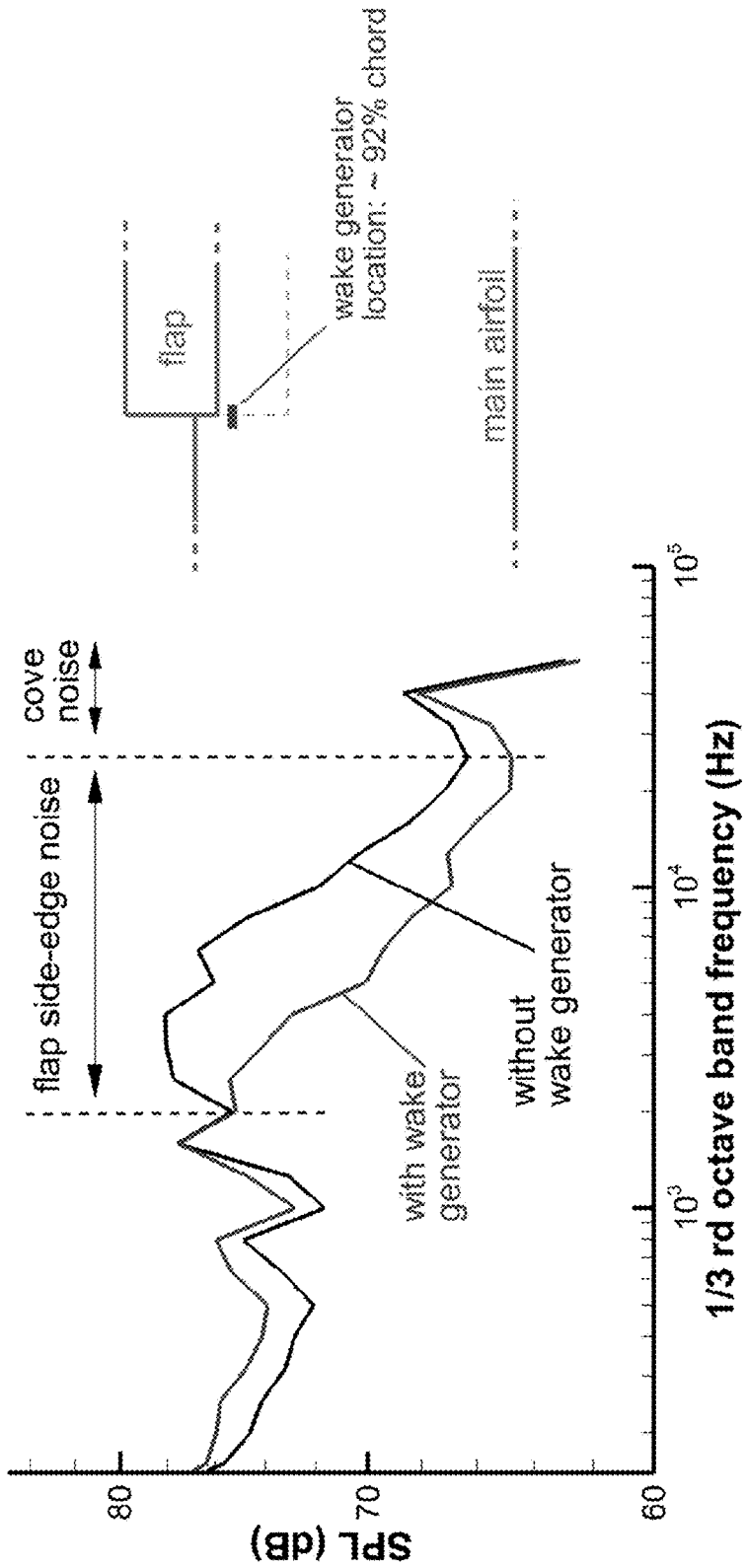
FIG. 6 is a graph of the effect of an embodiment wake generator on side edge noise.

The effect of the wake generator on the noise radiating from the flap side-edge is shown in the graph illustrated in FIG. 6. The flap was deployed at 39° and the free stream flow Mach number was 0.17. Noise spectra obtained from the center microphone of the phased array are displayed in FIG. 6. The wake was generated by bar #2 which was installed upstream of the flap side-edge, at 92% chord of the main airfoil. The noise spectrum obtained in the absence of the wake generator is also shown in FIG. 6. It is seen from FIG. 6 that up to 8 dB in noise reduction was achieved when the wake generator is placed directly upstream of the flap side-edge. With this wake generator placement, noise reduction was achieved over a broad frequency range which, in the absence of the wake generator, was dominated by the noise radiating from the flap side-edge. Thus, it was determined in previous studies performed on this particular wing/flap model configuration that the noise radiating from the flap side-edge dominates the frequency range between approximately 2 and 25 kHz, while the noise radiating from the flap cove region of the model dominates the noise spectra above approximately 25 kHz. The flap side-edge noise is generated by instabilities in the vortex system that is formed at the flap side-edge as well as in the strong shear layer that originates on the pressure side edge of the flaps. The bar's wake is believed to introduce a velocity deficit as well as instabilities in the flap side edge vortex system forming region, weakening that vortex system and hence the radiated noise.

Figure 7:
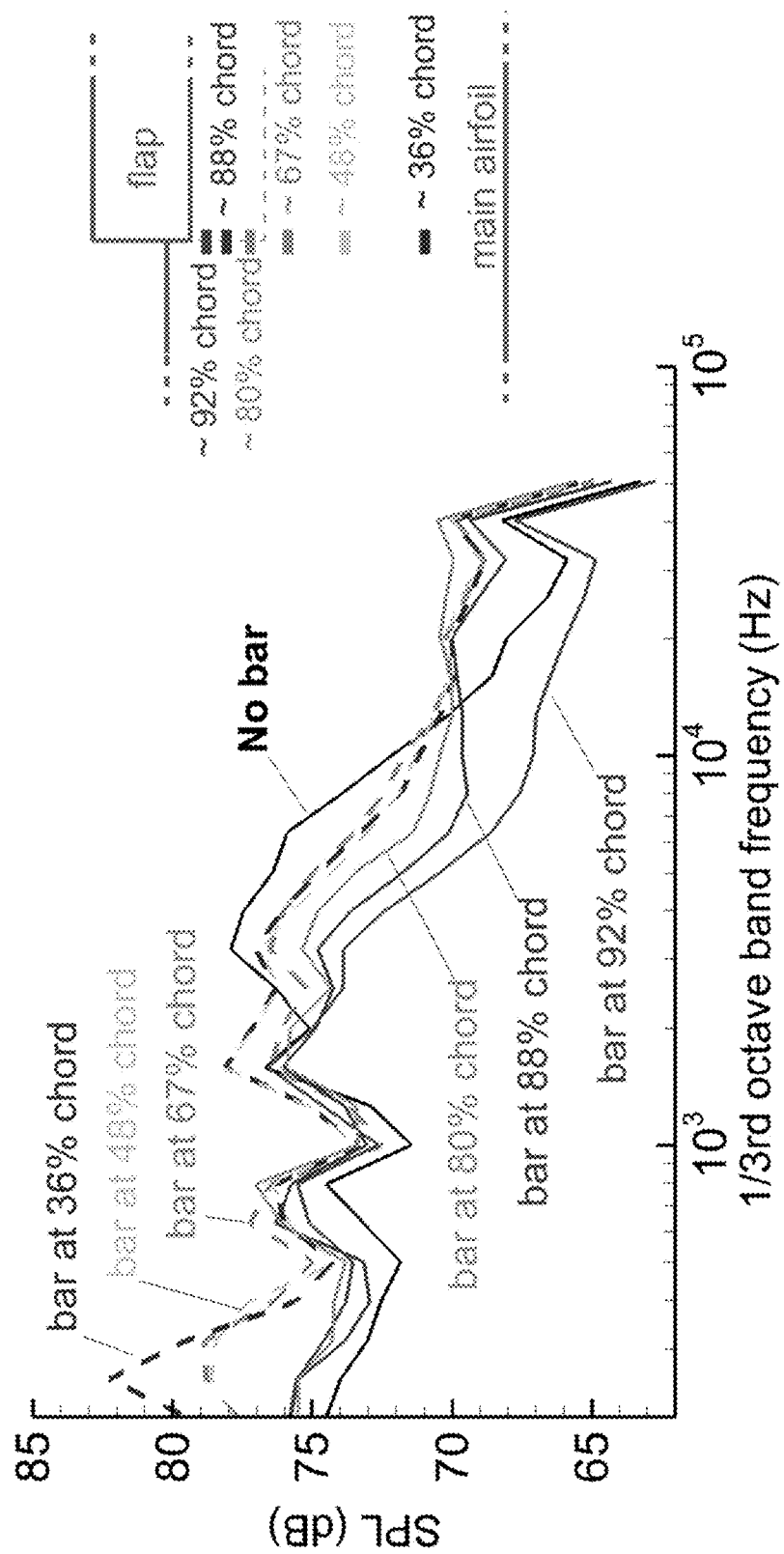
FIG. 7 is a graph of the effects of different placements of an embodiment wake generator on side edge noise.
Figure 8:
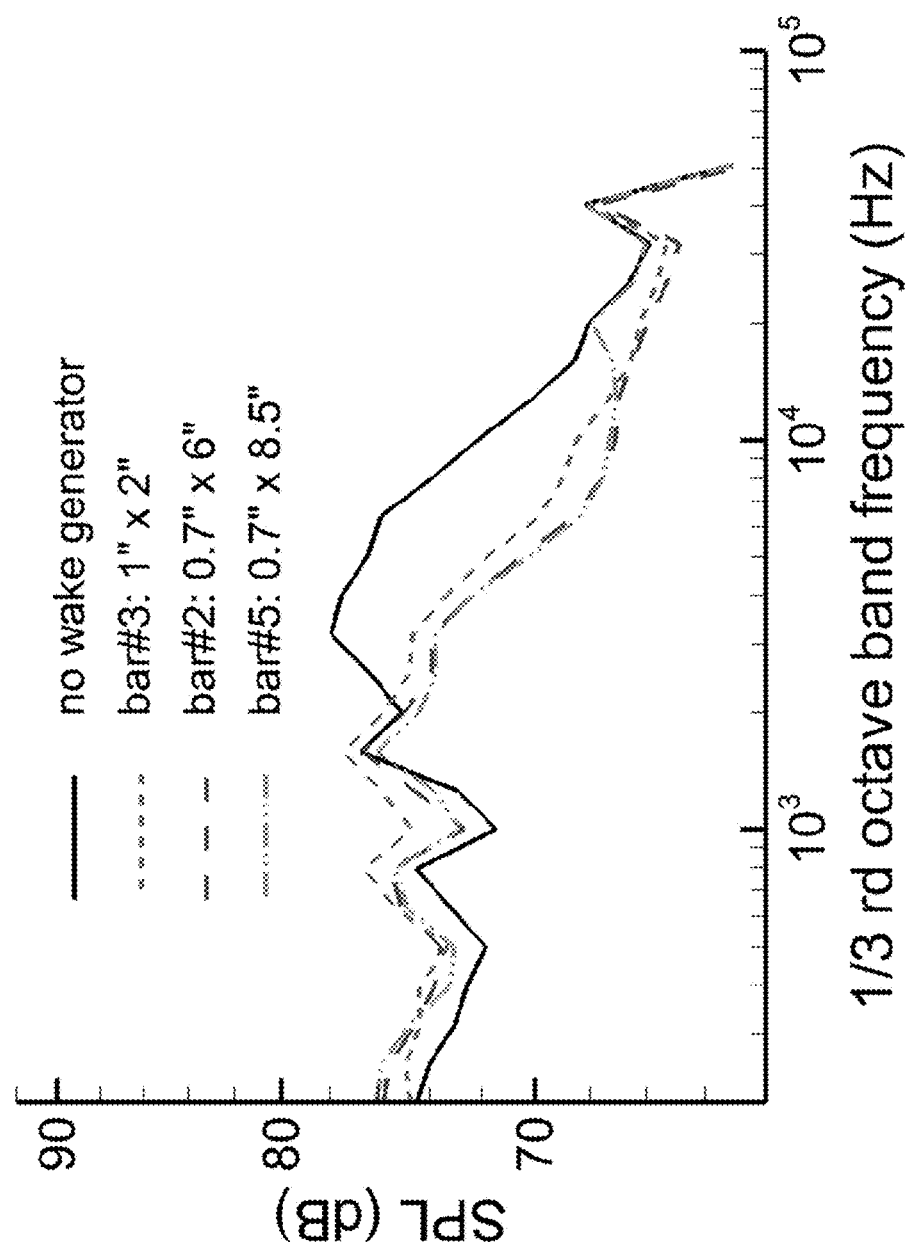
FIG. 8 is a graph of the effects of different geometries of an embodiment wake generator on side edge noise.

The effect of the wake generator streamwise location on the noise spectra is shown in FIG. 7. It is seen that as the bar was moved upstream from 92% chord to 67% chord, the flap side-edge noise reduction benefit is decreased. As the bar was moved further upstream, the noise spectra remain nearly unchanged (except for the development of a very low-frequency component around 250 Hz which may be produced by the appearance of quasi-periodicity in the interaction of the flap with the wake and eddies shed). FIG. 8 is a graph of the effects of different geometries of an embodiment wake generator on side edge noise.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A flow disruption device, operatively associated with a surface of a vehicle structure across which an air flow is flowing in a direction substantially extending from a leading edge portion of the surface toward a trailing edge portion of the surface and wherein the vehicle structure also comprises a substantially vertically oriented side edge portion disposed within a substantially vertical plane, for reducing noise generated by the air flow as the air flow flows across the substantially vertically oriented side edge portion, comprising:
   a body disposed upstream of the substantially vertically oriented side edge portion, configured to protrude vertically with respect to the surface and having a predetermined width dimension extending transversely with respect to the substantially vertical plane within which the side edge portion is disposed so as to extend into the air flow flowing across the surface in the direction extending substantially from the leading edge portion toward the trailing edge portion and thereby effectively block a portion of the air flow coming toward the surface and flowing across the surface in the direction extending substantially from the leading edge portion toward the trailing edge portion so as to produce a wake which introduces unsteadiness and a flow velocity deficit into a vortex formation region operatively associated with the side edge portion so as to, in turn, reduce noise generated by the air flow as the air flow flows over the side edge portion.

2. The flow disruption device of claim 1, further comprising an actuator configured to extend and retract the body from the surface.

3. The flow disruption device of claim 2, wherein the body is configured to telescopically extend and retract from the surface.

4. The flow disruption device of claim 3, wherein a length of the body is adjustable based on one or both of a flight condition and a flap deflection level.

5. The flow disruption device of claim 3, wherein the actuator is a Shape Memory Alloy (SMA) linear actuator.

6. The flow disruption device of claim 2, wherein the actuator is a Shape Memory Alloy (SMA) torque tube.

7. The flow disruption device of claim 2, wherein:
   the actuator is a first Shape Memory Alloy (SMA) torque tube and a second SMA linear actuator;
   the first SMA torque tube is configured to extend and retract the body from the surface; and the second SMA linear actuator is configured to adjust the length of the body.

8. The flow disruption device of claim 1, wherein the vehicle is an aircraft and the vehicle structure is a lift-augmentation control wing section.

9. The flow disruption device of claim 8, wherein the lift-augmentation control wing section is selected from the group consisting of a flap, a slat, and an elevon.

10. The flow disruption device of claim 8, wherein the body is selected from the group consisting of a bar, a tab, a spike, and a knob.

11. A method of utilizing a flow disruption device, operatively associated with a surface of a vehicle structure across which an air flow is flowing in a direction substantially extending from a leading edge portion of the surface toward a trailing edge portion of the surface and wherein the vehicle structure also comprises a vertically oriented side edge portion disposed within a substantially vertical plane, for reducing noise generated by the air flow as the air flow flows across the substantially vertically oriented side edge portion, comprising the step of:

installing a body at a location disposed upstream of the substantially vertically oriented side edge portion, configured to protrude vertically with respect to the surface and having a predetermined width dimension extending transversely with respect to the substantially vertical plane within which the side edge portion is disposed so as to extend into the air flow flowing across the surface in the direction extending substantially from the leading edge portion toward the trailing edge portion and thereby effectively block a portion of the air flow coming toward the surface and flowing across the surface in the direction extending substantially from the leading edge portion toward the trailing edge portion so as to produce a wake which introduces unsteadiness and a flow velocity deficit into a vortex formation region operatively associated with the side edge portion of the vehicle structure so as to, in turn, reduce noise generated by the air flow as the air flow flows over the side edge portion.

12. The method of claim 11, further comprising the step of:

using an actuator to extend and retract the body with respect to the surface.

13. The method of claim 12, wherein the actuator is selected from the group consisting of a Shape Memory Alloy (SMA) torque tube and a SMA linear actuator.

14. The method of claim 13, wherein the body is configured to telescopically extend and retract with respect to the surface.

15. The method of claim 14, wherein a length of the body is adjustable.

16. The method of claim 11, wherein the vehicle structure is selected from a group consisting of a flap, a slat, and an elevon.

17. The method of claim 16, wherein the body is selected from a group consisting of a bar, a tab, a spike, and a knob.

18. A method of utilizing a flow disruption device, operatively associated with a surface of a lift-augmentation control wing section across which an air flow is flowing in a direction substantially extending from a leading edge portion of the surface toward a trailing edge portion of the surface and wherein the lift-augmentation control wing section also comprises a substantially vertically oriented side edge portion disposed within a substantially vertical plane, for reducing noise generated by the air flow as the air flow flows across the substantially vertically oriented side edge portion, comprising the step of:

deploying a body at a location disposed upstream of the substantially vertically oriented side edge portion, vertically with respect to the surface and having a predetermined width dimension extending transversely with respect to the substantially vertical plane within which the side edge portion is disposed so as to extend into the air flow flowing across surface in the direction extending substantially from the leading edge portion toward the trailing edge portion and thereby effectively block a portion of the air flow coming toward the lift-augmentation control wing section and flowing across the leading edge portion toward the trailing edge portion so as to produce a wake which introduces unsteadiness and a flow velocity deficit into a vortex formation region operatively associated with the side edge portion so as to, in turn, reduce noise generated by the air flow as the air flow flows over the side edge portion.

19. The method of claim 18, wherein the lift-augmentation control wing section is selected from the group consisting of a flap, a slat, and an elevon.

20. The method of claim 19, wherein the body has a predetermined length dimension and the length of the body is adjusted based upon one or both of a flight condition and a flap deflection level.

* * * * *